(12) United States Patent
Qiu et al.

(10) Patent No.: US 11,180,016 B2
(45) Date of Patent: Nov. 23, 2021

(54) POWER SYSTEM FOR HYBRID VEHICLE

(71) Applicants: NINGBO UMD AUTOMATIC TRANSMISSION CO., LTD., Zhejiang (CN); ZHEJIANG GEELY HOLDING GROUP CO., LTD, Zhejiang (CN)

(72) Inventors: Zhiling Qiu, Ningbo (CN); Tejinder Singh, Ningbo (CN); Weiqian Xie, Ningbo (CN)

(73) Assignees: NINGBO UMD AUTOMATIC TRANSMISSION CO., LTD., Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 0 days.

(21) Appl. No.: 17/264,947

(22) PCT Filed: Mar. 14, 2019

(86) PCT No.: PCT/CN2019/078180
§ 371 (c)(1),
(2) Date: Feb. 1, 2021

(87) PCT Pub. No.: WO2020/024596
PCT Pub. Date: Feb. 6, 2020

(65) Prior Publication Data
US 2021/0309092 A1    Oct. 7, 2021

(30) Foreign Application Priority Data

Aug. 2, 2018    (CN) .......................... 201810872357.7
Aug. 2, 2018    (CN) .......................... 201821240684.2

(51) Int. Cl.
*B60K 6/365*    (2007.10)
*B60K 6/387*    (2007.10)
*B60K 6/48*    (2007.10)

(52) U.S. Cl.
CPC .............. *B60K 6/365* (2013.01); *B60K 6/387* (2013.01); *B60K 2006/4816* (2013.01); *B60K 2006/4825* (2013.01)

(58) Field of Classification Search
None
See application file for complete search history.

(56) References Cited

U.S. PATENT DOCUMENTS 7,220,201 B2 *   5/2007   Raghavan .............. B60K 6/445
                                                                    475/5
7,833,119 B2    11/2010   Klemen et al.
(Continued)

FOREIGN PATENT DOCUMENTS

CN    102114770 A    7/2011
CN    102463886 A    5/2012
(Continued)

OTHER PUBLICATIONS

International Search Report for PCT/CN2019/078180 (ISA/CN) dated May 24, 2019 (5 pages).
(Continued)

*Primary Examiner* — Dirk Wright
(74) *Attorney, Agent, or Firm* — Alston & Bird LLP (57) ABSTRACT

The present invention provides a power system for a hybrid vehicle, relating to the field of hybrid vehicles. The power system mainly includes an engine, a first motor, a second motor, a first planetary gear mechanism, a second planetary gear mechanism, a first input shaft, a first clutch, a brake, and a second clutch. Since the second motor is connected to the first input shaft through the second planetary gear
(Continued)

mechanism, the planetary gear mechanism can reduce the speed of the second motor and increase the torque to effectively reduce the size of the second motor or improve the acceleration performance of the vehicle. Since the first clutch between the first input shaft and the engine is disengaged when driven by the second motor, the drag resistance of the engine is reduced, and the fuel economy of the vehicle is improved.

9 Claims, 4 Drawing Sheets

(56) References Cited

U.S. PATENT DOCUMENTS

| | | | |
|---|---|---|---|
| 9,387,752 B2 * | 7/2016 | Puiu | B60K 6/445 |
| 2012/0220403 A1 | 8/2012 | Heinz | |
| 2015/0148172 A1 | 5/2015 | Puiu et al. | |
| 2021/0178889 A1 * | 6/2021 | Singh | B60K 6/365 |

FOREIGN PATENT DOCUMENTS

| | | |
|---|---|---|
| CN | 103057395 A | 4/2013 |
| CN | 106042890 A | 10/2016 |
| CN | 108944413 A | 12/2018 |
| DE | 102009046366 A1 | 5/2011 |
| DE | 102015213516 A1 | 1/2017 |
| EP | 2472144 A1 | 7/2012 |
| WO | WO 2012/137151 A1 | 10/2012 |

OTHER PUBLICATIONS

Written Opinion of the International Searching Authority for PCT/CN2019/078180 (ISA/CN) dated May 24, 2019 (4 pages).

European Search Report for EP Application No. 19843232.0 dated Jun. 25, 2021 (4 pages).

* cited by examiner

POWER SYSTEM FOR HYBRID VEHICLE

CROSS-REFERENCE TO RELATED APPLICATIONS

The present application is a national phase entry of International Application No. PCT/CN2019/078180, filed Mar. 14, 2019, which claims priority to Chinese Patent Application No. 201810872357.7, and Chinese Patent Application No. 201821240684.2, filed Aug. 2, 2018, respectively, which are incorporated herein by reference in their entirety.

TECHNICAL FIELD

The present invention relates to the field of hybrid vehicles, and more particularly relates to a power system for a hybrid vehicle.

BACKGROUND

At present, the use of gasoline-electric hybrid power as a vehicle power source has increasingly become the mainstream trend of vehicle development. A gasoline-electric hybrid vehicle usually includes an engine with a smaller displacement than a traditional engine and one or two motors. Under normal circumstances, when driving at low speeds (such as urban roads) or requiring frequent starting, the vehicle can be driven only by the motor; and when high-speed driving is required, only the engine can be used to drive the vehicle to save energy. In the prior art, hybrid modes of gasoline-electric hybrid vehicles mainly include a serial mode, a parallel mode and a serial-parallel mode.

A power system in an existing hybrid vehicle has a relatively simple structure and poor adaptability.

SUMMARY OF THE INVENTION

One objective of the present invention is to provide a power system for a hybrid vehicle with a simple structure and strong adaptability.

A further objective of the present invention is to change the output torque of a second motor, so as to effectively reduce the size of the second motor or improve the acceleration performance of the vehicle.

On the one hand, the present invention provides a power system for a hybrid vehicle. The power system includes an engine, a first motor, a second motor, a first planetary gear mechanism, a second planetary gear mechanism, a first input shaft, a first clutch, a second clutch, and a brake.

The engine is in transmission connection with the first motor. The first clutch is arranged between the first motor and the first input shaft to cut off or connect power transmission between the first motor and the first input shaft through the first clutch.

The first planetary gear mechanism includes a first sun gear, at least one set of planetary gears, a first gear ring, and a first planetary carrier. The first sun gear is arranged on the first input shaft to enable the first sun gear to rotate with the first input shaft. The first gear ring is configured to transmit power output by the power system.

The brake is arranged between the first planetary carrier and a housing of the power system. The brake is engaged to realize a first gear of the power system. The second clutch is configured to enable the first planetary carrier to rotate with the first input shaft when the second clutch is in an engaged state, to realize a second gear of the power system.

The second motor is connected to the first input shaft and is configured to drive the first input shaft to rotate. The second motor is connected to the first input shaft through the second planetary gear mechanism, and the second planetary gear mechanism includes a second sun gear, at least one set of planetary gears, a second gear ring, and a second planetary carrier.

Optionally, any one of the three components, namely the second sun gear, the second gear ring, and the second planetary carrier, is fixed relative to the housing of the power system. A second rotor of the second motor is in transmission connection with one of the unfixed components to power it, and the other unfixed component is in transmission connection with the first input shaft to drive the first input shaft.

Optionally, the second sun gear is fixed to a rear housing. The second gear ring is fixed on the second rotor of the second motor and rotates together with the second rotor. The second motor transmits power to the first input shaft through the second planetary carrier.

Optionally, the second sun gear is fixed on the second rotor of the second motor and rotates together with the second rotor. The second planetary carrier is installed on the rear housing and is fixed relative to the rear housing. The second motor transmits power to the first input shaft through the second gear ring.

Optionally, the second sun gear is in transmission connection with an output shaft of the second motor through a transmission chain. The second gear ring is installed on the rear housing and is fixed relative to the rear housing. The second motor transmits power to the first input shaft through the second planetary carrier.

Optionally, the second rotor of the second motor is in transmission connection with one of the unfixed components in the second planetary gear mechanism through a rotor support plate.

Optionally, the power system further includes an intermediate support fixedly installed at one end of a front housing close to the first planetary gear mechanism, and a cavity structure for installing the brake and a third actuator cylinder corresponding to the brake is formed between the intermediate support and the front housing.

Optionally, the first gear ring is in transmission connection with an output gear of the power system. The output gear is supported on the intermediate support through a first support bearing. The intermediate support is supported on the first planetary carrier through a sliding bearing.

Optionally, the power system further includes a second input shaft sleeved over the outside of the first input shaft, and the first input shaft and the second input shaft are independent of each other.

One end of the second input shaft is in transmission connection with the first planetary carrier. The other end of the second input shaft is in transmission connection with the second clutch. The second input shaft is also in transmission connection with the brake.

Optionally, the power system further includes a first actuator cylinder corresponding to the first clutch and a second actuator cylinder corresponding to the second clutch.

The first actuator cylinder, the second actuator cylinder, and the third actuator cylinder are all arranged in the front housing, and an oil channel connected to the first actuator cylinder, the second actuator cylinder and the third actuator cylinder is also arranged in the front housing.

Optionally, the power system further includes a driven gear meshed with the output gear and a parking ratchet for braking. The driven gear and the parking ratchet are integrated.

Optionally, the power system further includes a differential mechanism and an intermediate shaft for outputting power. The differential mechanism is in transmission connection with a main reduction gear of the intermediate shaft through a third planetary gear mechanism. The third planetary gear mechanism includes a third sun gear, at least one set of planetary gears, a third gear ring, and a third planetary carrier. Any one of the three components, namely the third sun gear, the third gear ring, and the third planetary carrier, is fixed relative to the housing of the power system. The main reduction gear is in transmission connection with one of the unfixed components to power it, and the other unfixed component is in transmission connection with an input end of the differential mechanism to drive the differential mechanism.

Optionally, the first actuator cylinder controls the first clutch through a first release bearing, and the second actuator cylinder controls the second clutch through a second release bearing.

Optionally, the second sun gear is fixed to the rear housing. The second gear ring is fixed on the second rotor of the second motor and rotates together with the second rotor. The second motor transmits power to the first input shaft through the second planetary carrier.

Optionally, the second sun gear is fixed on the second rotor of the second motor and rotates together with the second rotor. The second planetary carrier is installed on the rear housing and is fixed relative to the rear housing. The second motor transmits power to the first input shaft through the second gear ring.

Optionally, the second sun gear is in transmission connection with the output shaft of the second motor through a transmission chain. The second gear ring is installed on the rear housing and is fixed relative to the rear housing. The second motor transmits power to the first input shaft through the second planetary carrier.

In the power system for a hybrid vehicle, provided by the present invention, since the second motor is connected to the input shaft through the second planetary gear mechanism, the planetary gear mechanism can reduce the speed of the second motor and increase the torque to effectively reduce the size of the second motor or improve the acceleration performance of the vehicle.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numbers in the drawings mark the same or similar components or parts. Those skilled in the art should understand that these drawings are not necessarily drawn in scale. In the drawings.

DETAILED DESCRIPTION OF THE INVENTION

Embodiment I

Figure 1:
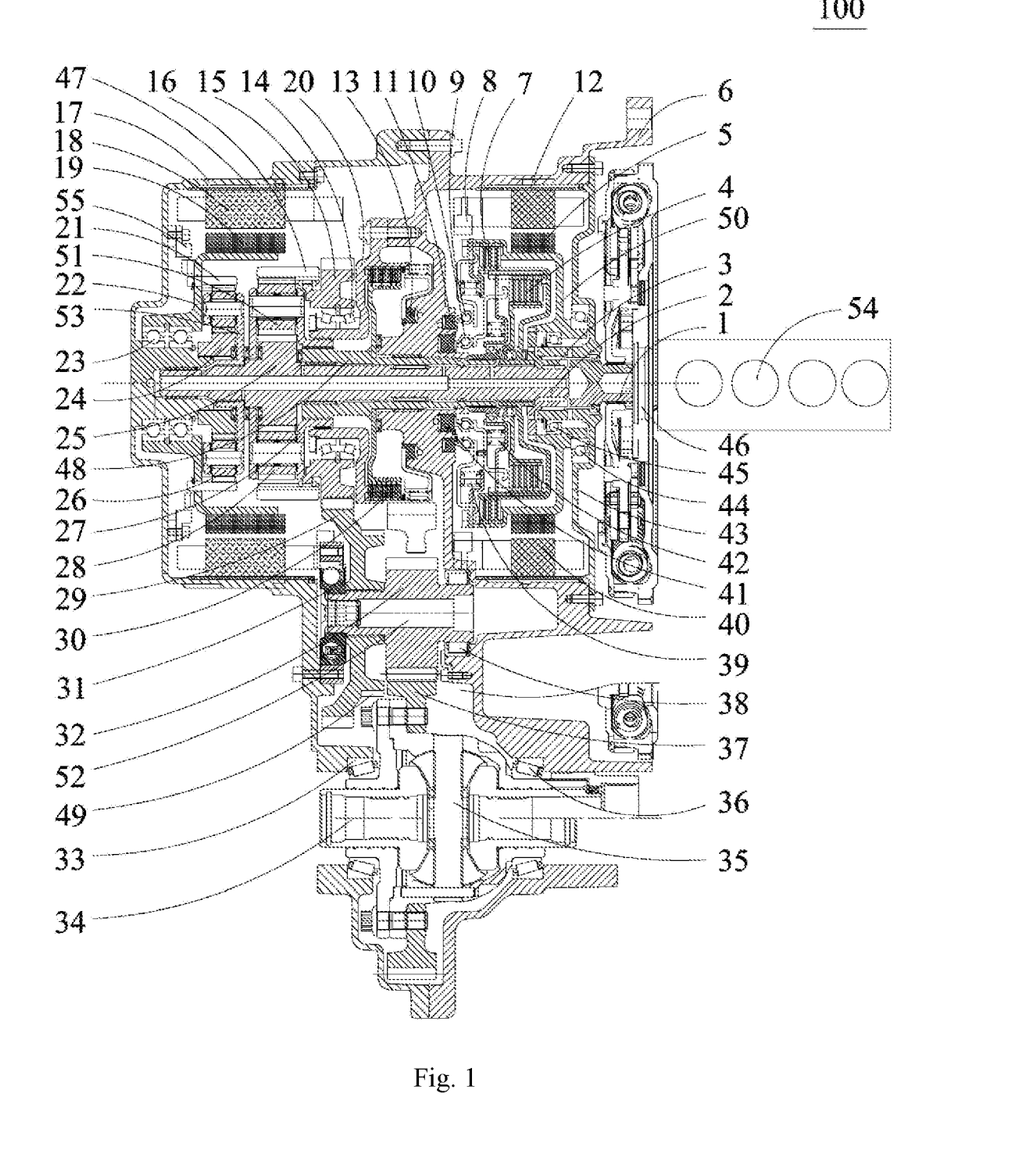
FIG. 1 is a schematic structural diagram of a power system according to an embodiment of the present invention.

FIG. 1 is a schematic structural diagram of a power system 100 according to an embodiment of the present invention. The power system 100 of the present invention is not only applicable to a vehicle with a two-wheel drive transmission mechanism, but also applicable to a vehicle with a four-wheel drive transmission structure. As shown in FIG. 1, the power system 100 mainly includes an engine 54, a first motor 101, a second motor 102, a first planetary gear mechanism 104, a first input shaft 2, a first clutch 7, and a brake 30. The first motor 101 includes a first stator 40 and a first rotor 5, and the second motor 102 includes a second stator 18 and a second rotor 19. The engine 54 is in transmission connection with the first motor 101, and the first clutch 7 is arranged between the first motor 101 and the first input shaft 2 to cut off or connect power transmission between the first motor 101 and the first input shaft 2 through the first clutch 7. The first planetary gear mechanism 104 includes a first sun gear 25, at least one set of planetary gears, a first gear ring 16, and a first planetary carrier 27. The first sun gear 25 is arranged on the first input shaft 2 to enable the first sun gear 25 to rotate with the first input shaft 2. The first gear ring 16 is configured to transmit power output by the power system 100. The brake 30 is arranged between the first planetary carrier 27 and a housing of the power system 100. The power system 100 further includes a second clutch 4, and the second clutch 4 is configured to enable the first planetary carrier 27 to rotate with the first input shaft 2 when the second clutch 4 is in an engaged state. The second motor 102 is connected to the first input shaft 2 and is configured to drive the first input shaft 2 to rotate. The second motor 102 is connected to the first input shaft 2 through a second planetary gear mechanism 103, and the second planetary gear mechanism 103 includes a second sun gear 24, at least one set of planetary gears, a second gear ring 21, and a second planetary carrier 53. Any one of the components, namely the second sun gear 24, the second gear ring 21, and the second planetary carrier 53, is fixed relative to the housing of the power system 100, the second rotor of the second motor 102 is connected to one of the unfixed components to power it, and the other unfixed component is connected to the first input shaft 2 to drive the first input shaft. Specifically, six different transmission modes can be realized between the second motor and the first input shaft, and the most suitable transmission mode may be selected according to an actual required transmission ratio, the size of the second motor, the installation position of the second motor, and the like.

In the power system 100 for a hybrid vehicle, provided by the present invention, since the second motor 102 is connected to the input shaft through the second planetary gear mechanism 103, the planetary gear mechanism can reduce the speed of the second motor 102 and increase the torque to effectively reduce the size of the second motor 102 or improve the acceleration performance of the vehicle. Since the first clutch 7 between the first input shaft 2 and the engine 54 is disengaged when driven by the second motor 102, the drag resistance of the engine 54 is reduced, and the fuel economy of the vehicle is improved.

With continuing reference to FIG. 1, the structural diagram of the power system 100 shown in FIG. 1 includes the following structures: a motor input shaft 1, the first input shaft 2, a needle bearing 3, the second clutch 4, the first rotor 5, a front housing 6, the first clutch 7, a first rotation speed sensor 8, a first release bearing 9, a second release bearing 10, a first actuator cylinder 11, a first cooling water jacket 12, a third actuator cylinder 13, a first support bearing 14, an output gear 15, the first gear ring 16, a rear housing 17, the second stator 18, the second rotor 19, an intermediate support 20, the second gear ring 21, a rotor support plate 22, a second support bearing 23, the second sun gear 24, the first sun gear 25, a second planetary gear 26, the first planetary carrier 27, first double-row planetary gears 28, a driven gear 29, the brake 30, a left support bearing 31, a main reduction gear 32, a support bearing 33 at a left end of a differential mechanism, an output half shaft 34 of the differential mechanism, an assembly of the differential mechanism 35, a support bearing 36 at a right end of the differential mechanism, a gear ring 37 of the differential mechanism, a support bearing 38 at a right end of an intermediate shaft 52, a first return spring 39, the first stator 40, the third actuator cylinder 13, a second return spring 42, a clutch front end cover 43, a support bearing 44 on the outside of a hub of the second clutch 4, a support bearing 45 on the inside of the hub of the second clutch 4, a dual mass flywheel 46, a second cooling water jacket 47, a second input shaft 48, a parking ratchet 49, an outer hub 50 of the first clutch, second double-row planetary gears 51, the intermediate shaft 52, the second planetary carrier 53, the engine 54, and a second rotation speed sensor 55.

The first motor 101, the first clutch 7 and the second clutch 4 are all arranged in an accommodating space of the front housing 6. The first rotor 5 of the first motor 101 is in spline connection with the first input shaft 2 through the outer hub of the first clutch 7. The first cooling water jacket 12 for cooling the first motor 101 is arranged between the first motor 101 and an inner wall of the front housing 6, the first actuator cylinder 11 corresponding to the first clutch 7 and a second actuator cylinder 41 corresponding to the second clutch 4 are also arranged in the front housing 6, both the first actuator cylinder 11 and the second actuator cylinder 41 are arranged in the front housing 6, and an oil channel connected to the first actuator cylinder 11 and the second actuator cylinder 41 is arranged in the front housing 6. The power system 100 further includes the intermediate support 20 fixedly installed at one end of the front housing 6 close to the first planetary gear mechanism 104, and a cavity structure for installing the brake 30 and the third actuator cylinder 13 corresponding to the brake 30 is formed between the intermediate support 20 and the front housing 6. Specifically, the intermediate support 20 and a rear end of the front housing 6 form a relatively closed cavity, the third actuator cylinder 13 of the brake 30 and the brake 30 are arranged in this cavity, and this space can be effectively used. The brake 30 may be a multi-disc clutch brake 30 or a belt brake 30. The third actuator cylinder 13 is arranged in the front housing 6, and an oil channel connected to the third actuator cylinder 13 is arranged in the front housing 6.

With continuing reference to FIG. 1, the first gear ring 16 is fixedly connected to the output gear 15 of the power system 100 through splines, the output gear 15 is supported on the intermediate support 20 through a bearing, and an inner end surface of the intermediate support 20 is connected to the first planetary carrier 27 through a bearing. The first gear ring 16 is connected to the output gear 15 through splines, and the output gear 15 is supported on the intermediate support 20 through the first support bearing 14. Thus, power can be synchronously, stably and efficiently transmitted to the output gear 15 from the first gear ring 16 of the first planetary gear mechanism 104. In this solution, the intermediate support 20 is arranged on a rear end surface of the front housing 6, and then, the inner end surface of the intermediate support 20 is connected to the first planetary carrier 27 through a bearing, so as to effectively transmit a radial force generated by the meshing of the output gear 15.

By adopting the above settings for the three actuator cylinders, on the one hand, the space is saved; and on the other hand, pressure oil can directly enter the actuator cylinders through the oil channel in the front housing 6, which facilitates high-pressure oil sealing and shortens the oil passage. The centralized arrangement of the above three actuator cylinders further facilitates the arrangement and management of high-pressure oil channels of the system.

With continuing reference to FIG. 1, the second motor 102, the first planetary gear mechanism 104 and the second planetary gear mechanism 103 are arranged in an accommodating space of the rear housing 17, and the second cooling water jacket 47 for cooling the second motor 102 is arranged between the second motor 102 and an inner wall of the rear housing 17. The first sun gear 25 of the first planetary gear mechanism 104 and the first input shaft 2 are fixed together. One side of the first planetary carrier 27 is fixedly connected to a rotary drum of the brake 30 through the second input shaft 48, and the brake 30 fixed on the intermediate support 20 can brake the first planetary carrier 27 when the third actuator cylinder 13 acts. The second sun gear 24 is fixed to the rear housing 17. The second gear ring 21 is fixed on the second rotor 19 of the second motor 102 and rotates together with the second rotor 19, and the second motor 102 transmits power to the first input shaft 2 through the second planetary carrier 53.

The power system 100 further includes the second input shaft 48 sleeved over the outside the first input shaft 2, and the first input shaft 2 and the second input shaft 48 are independent of each other. The first planetary carrier 27 is connected to the first input shaft 2 through the second input shaft 48 and the second clutch 4. One end of the second input shaft 48 is fixedly connected to the first planetary carrier 27, the other end of the second input shaft is connected to the second clutch 4, and the second input shaft 48 is fixedly connected to the brake 30. In this way, three components are connected to the first input shaft through a hollow shaft sleeve, thereby effectively shortening the radial space of a transmission and making the arrangement more compact.

With continuing reference to FIG. 1, in the present embodiment, the second motor and the first input shaft are coaxially arranged. The second rotor 19 of the second motor 102 is fixedly connected to the second gear ring 21 through the rotor support plate 22. In the present embodiment, the rotor support plate 22 is used to connect the second rotor 19 of the second motor 102 and the second gear ring 21 through splines (using a clamping ring or riveting or fixing mode), so that power is transmitted from the second motor to the second planetary gear mechanism. The rotor support plate 22 may be supported on the rear housing 17 of the transmission by using one or more second support bearings 23 according to the needs of force borne by it. By means of such arrangement mode, the second planetary gear mechanism 103 can be arranged on the inside of the second rotor 19, so that the arrangement space is optimized, and the axial length is shortened. Further, according to the power needs of the entire vehicle, the connection mode of the motor rotor and the second planetary gear mechanism 103 may be changed by changing the arrangement mode, so as to change the transmission ratio of motor torque and rotation speed output to meet the needs of the entire vehicle.

In the present embodiment, the front housing 6 and the rear housing 17 are fixedly connected by bolts or other connection modes to form a complete transmission housing (or called as the housing of the power system). In other embodiments, the entire housing may also be integrated. Two ends of the first input shaft 2 are respectively in transmission connection with the first motor 101 and the second motor 102. A tail end of a crankshaft of the engine 54 is connected to the motor input shaft 1 of the first motor 101 through the dual mass flywheel 46. In other embodiments, the dual mass flywheel 46 may be replaced with a shock absorber, a single mass flywheel or a connecting disc. When the second clutch 4 acts, input and output rotation speeds of the first planetary gear mechanism 104 are equal, and the speed ratio is 1. The first gear ring 16 of the first planetary gear mechanism 104 serves as an output gear, and the output gear 15 in spline connection with it is supported on the intermediate support 20 through the first support bearing 14 and then meshed with the driven gear 29 on the intermediate shaft 52, to shift the input power received by the first planetary gear mechanism 104 and then transmit it to the intermediate shaft 52. The second rotor 19 of the second motor 102 is connected to the second gear ring 21 of the second planetary gear mechanism 103 through the rotor support plate 22, and then supported on the rear housing 17 of the transmission through the second support bearing 23. The second sun gear 24 of the second planetary gear mechanism 103 is fixed on the rear housing 17 of the transmission. In the present embodiment, an output component of the second planetary gear mechanism 103 is the second planetary carrier 53. The second planetary gear mechanism 103 changes the speed of the second motor 102 and then transmits it to the first input shaft 2, and the first planetary gear mechanism 104 shifts the input speed and then transmits it to the intermediate shaft 52. Then, the main reduction gear 32 of the intermediate shaft 52 drives the gear ring 37 of the differential mechanism on the differential mechanism 35 to transmit the driving power of the engine 54 and the second motor 102 to the output half shaft 34 of the differential mechanism, so as to drive the vehicle to move.

In the present embodiment, the first rotation speed sensor 8 for detecting a rotation speed of the first motor 101 and the second rotation speed sensor 55 for detecting a rotation speed of the second motor 102 are also arranged in the transmission housing.

Further, the power system 100 further includes the driven gear 29 meshed with the output gear 15 and the parking ratchet 49 for braking. The driven gear 29 and the parking ratchet 49 are integrated. The driven gear 29 and the parking ratchet 49 adopt an integrated design structure, which is favorable for saving the arrangement space, reducing the processing of parts, and saving the cost.

Further, according to the needs of the transmission ratio, the transmission ratio of the main reduction gear 32 of the intermediate shaft 52 to the gear ring 37 of the differential mechanism can be adjusted in the arrangement space to adapt to the needs of the entire vehicle, which is beneficial to platform development.

Further, the right end of the intermediate shaft 52 is supported by a cushion block, which is flexible and can be adjusted according to the space. The right end of the intermediate shaft 52 may alternatively be supported on the front housing 6, which depends on the space needs.

Figure 4:
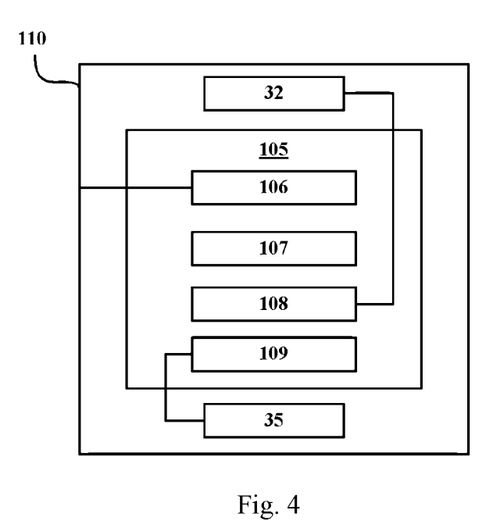
FIG. 4 is a schematic block diagram of a third planetary gear mechanism of a power system according to still another embodiment of the present invention.

Further, the differential mechanism 35 is in transmission connection with the main reduction gear 32 of the intermediate shaft 52 through a third planetary gear mechanism 105. The third planetary gear mechanism 105 includes a third sun gear 108, at least one set of planetary gears 107, a third gear ring 106, and a third planetary carrier 109. Any one of the components, namely the third sun gear, the third gear ring, and the third planetary carrier, is fixed relative to a housing 110 of the power system, the main reduction gear 32 is connected to one of the unfixed components to power it, and the other unfixed component is connected to an input end of the differential mechanism 35 to drive the differential mechanism. Specifically, six different transmission modes can be realized between the second motor and the first input shaft, and the most suitable transmission mode may be selected according to the actual required transmission ratio, the size of the second motor, the installation position of the second motor, and the like.

In a specific embodiment, referring to FIG. 4, the input end of the differential mechanism 35 can be in transmission connection with the main reduction gear 32 of the intermediate shaft by adopting the third planetary gear mechanism 105. The third gear ring 106 of the third planetary gear mechanism is fixed, power is input through the third sun gear 108 and transmitted to the third planetary carrier 109 integrated with the housing of the differential mechanism, and then, the power is output by the output half shaft of the differential mechanism.

With continuing reference to FIG. 1, the first actuator cylinder 11 controls the first clutch 7 through the first release bearing 9, and the second actuator cylinder 41 controls the second clutch 4 through the second release bearing 10. Specifically, after receiving an engagement signal, the actuator cylinder pushes the release bearing to engage the clutch, and after the engagement signal disappears, the clutch is disengaged under the action of the return spring. In other embodiments, the release bearing may be a balance cavity structure of an automatic transmission (AT) structure. In this solution, the release bearing is used instead of the balance cavity structure to save the arrangement space.

Multiple working modes of the power system 100 in the present embodiment are shown below, and are specifically as follows:

1. Starting and Charging of Engine 54

The engine 54 is in spline connection with the outer hub 50 of the first clutch through the dual mass flywheel 46 and the motor input shaft 1, the outer hub 50 of the first clutch is fixedly connected to the first rotor 5 of the first motor 101, and the first motor 101 can rotate to start the engine 54. On the contrary, the engine 54 can operate to drive the first motor 101 to charge a battery. The main function of the first motor 101 is to generate power, and the rotation speed of the first motor 101 is always consistent with that of the engine 54, therefore, the high-efficiency rotation speed ranges of the engine 54 and the first motor 101 should be designed to be consistent.

2. Single Driving of Engine 54

When the engine 54 operates, the first clutch 7 is engaged to transmit all or part of the power of the engine 54 to the first input shaft 2. If the brake 30 is engaged, the first sun gear 25 on the first input shaft 2 drives the first gear ring 16 through the first double-row planetary gears 28 and the second double-row planetary gears 51. The double-row planetary gear mechanism is adopted to ensure the consistent rotation of the sun gear and the gear ring. The output gear 15 is meshed with the driven gear 29 on the intermediate shaft 52 to transmit the power of the engine 54 to the intermediate shaft 52. The main reduction gear 32 on the intermediate shaft 52 is meshed with the gear ring 37 of the differential mechanism on the differential mechanism 35 to drive the output half shaft 34 of the differential mechanism. During single driving of the engine 54, a certain power can also be distributed to charge a battery through the first motor 101. According to the operating conditions of the vehicle, the remaining power of the engine 54 can be distributed to the first motor 101, so as to improve the fuel economy. At full throttle, the torque of the first motor 101 can be controlled to be 0, and all the power of the engine 54 can be used for driving, so as to ensure the starting acceleration of the vehicle. When the vehicle speed is relatively high, the brake 3030 is released, the second clutch 4 is engaged, and the speed ratio of the first planetary gear mechanism 104 is reduced from about 3 in a first gear to 1 in a second gear. If the overall speed ratio of the first gear is 9, the speed ratio of the second gear becomes 3, which is just used for high-speed cruising or high-efficiency power generation.

3. Single Driving of Motor

The first clutch 7 is disengaged, and the second motor 102 is started. The second sun gear 24 in the second planetary gear mechanism 103 is fixed on the rear housing 17 of the transmission, and the second rotor 19 of the second motor 102 drives the second gear ring 21 to rotate through the rotor support plate 22. At this time, the output speed of the second planetary carrier 53 decreases to:

$$\frac{n_r}{n_c} = \frac{a_1 + 1}{a_1}.$$

In the above formula, $n_r$ is a rotation speed of the second gear ring 21, that is, the second rotor 19, $n_c$ is an output speed of the second planetary carrier 53 of the second planetary gear mechanism 103, and $\alpha_1$ is a gear ratio of the second gear ring 21 to the second sun gear 24. Generally, the value of $\alpha_1$ is set between 2 and 3. It can be seen from the above formula that the second planetary gear mechanism 103 reduces the motor speed by about ⅓, that is, increases the torque by 50%, thereby effectively reducing the size of the motor or improving the acceleration performance of the vehicle.

4. Simultaneous Driving of Engine 54 and Motor

The second motor 102 and the engine 54 are started at the same time, the first clutch 7 is engaged, the torque of the engine 54, from which the torque of dragging the first motor 101 is subtracted, is transmitted to the first input shaft 2 through the first clutch 7. The torque of the second motor 102 is also superimposed on the first input shaft 2 after being amplified through the second planetary gear mechanism 103. If the torque of the second motor 102 is controlled to be a peak torque, the maximum input torque (on the first input shaft 2) can reach:

$$T_{in} = T_e + \frac{a_1 + 1}{a_1} T_{p3}.$$

In the formula: $T_e$ is an output torque of the engine 54, $T_{p3}$ is an output torque of the second motor 102, and $T_{in}$ is an input torque. This torque is equivalent to twice an output torque of an ordinary engine 54, which can ensure good acceleration performance of the vehicle.

5. Gear Shift

During driving of the engine 54, the first clutch 7 and the brake 30 are engaged, and the torque of the engine 54 is transmitted to the first input shaft 2 through the first clutch 7. The first sun gear 25 of the first planetary gear mechanism 104 serves as an input gear, the first gear ring 16 is an output gear, and the speed ratio of the first planetary gear mechanism 104 is $\alpha_2$. $\alpha_2$ is a gear ratio of the first gear ring 16 to the first sun gear 25. Generally, the value of $\alpha_2$ is set between 2 and 3.

When the speed is higher than a set value, the brake 30 is released, the second clutch 4 is engaged, the first sun gear 25 of the first planetary gear mechanism 104 rotates at the same speed as the first planetary carrier 27, and the speed ratio of the first planetary gear mechanism 104 decreases to 1. If the product of the speed ratios of the output gear 15, the driven gear 29, the main reduction gear and the gear ring 37 of the differential mechanism is $i_d$, the overall speed ratio of the second gear driven by the engine 54 is $i_d$, which is just used to drive the vehicle to cruise at a high speed or to efficiently generate power. The overall speed ratio of the first gear is $i_d\alpha_2$, which can be used to assist the motor to start or accelerate.

During driving of the second motor 102, only the brake 30 needs to be engaged to realize the speed ratio of the first gear. The overall speed ratio of the first gear is:

$$i_d \alpha_2 \frac{a_1 + 1}{a_1}.$$

When the vehicle speed is relatively high, the brake 30 is released, the second clutch 4 (C0) is engaged, and the speed ratio of the first planetary gear mechanism 104 is 1. The overall speed ratio of the second gear is:

$$i_d \frac{a_1 + 1}{a_1}.$$

The first gear and the second gear in the present invention are only gear names, and do not specifically refer to the sequential gears in a vehicle gearbox.

6. Vehicle Braking Energy Recovery

When the vehicle decelerates for braking, the brake 30 is engaged, and the inertia of the vehicle drags the gear ring 37 of the differential mechanism, the first sun gear 25, the first input shaft 2, the second planetary carrier 53, the second gear ring 21 and the second rotor 19 to generate power through the differential mechanism 35 and the output half shaft 34 of the differential mechanism, so as to realize braking energy recovery.

Embodiment II

Figure 2:
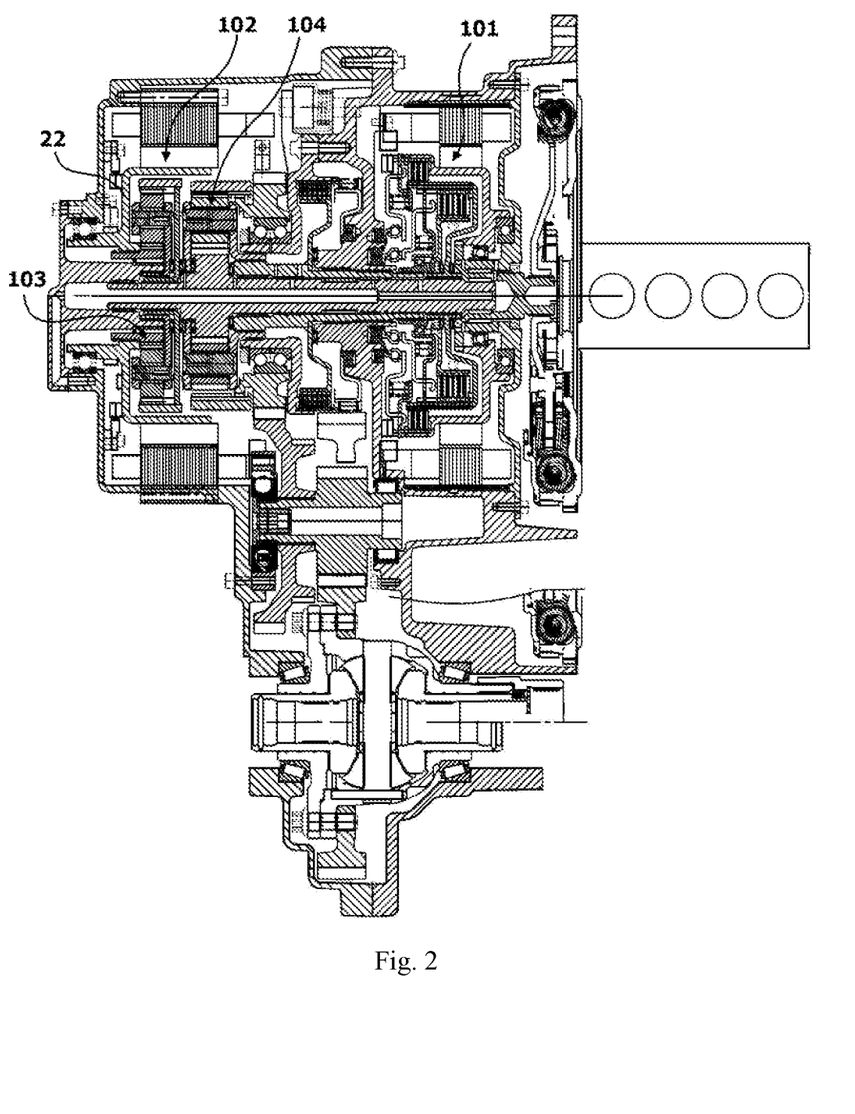
FIG. 2 is a schematic structural diagram of a power system according to another embodiment of the present invention.

FIG. 2 is a schematic structural diagram of a power system 100 according to another embodiment of the present invention. If a larger reduction ratio is required, the second planetary gear mechanism 103 can adopt different connection modes. In the present embodiment, the second motor and the first input shaft are also coaxially arranged. Referring to FIG. 2, the second sun gear 24 is fixed on the second rotor 19 of the second motor 102 and rotates together with the second rotor 19. Specifically, the second sun gear 24 is in transmission connection with the second rotor 19 of the second motor 102 through the rotor support plate 22, the second planetary carrier 53 is installed on the rear housing 17 and is fixed relative to the rear housing 17, and the second gear ring 21 is in transmission connection with the first input shaft 2. The second motor 102 transmits power to the first input shaft 2 through the second gear ring 21. With the above structure, the larger reduction ratio can be obtained.

In the present embodiment, except for the different connection modes of the second motor 102 and the first input shaft 2, other connection structures and operating modes are not much different from those in Embodiment I, so they will not be described in detail.

Embodiment III

Figure 3:
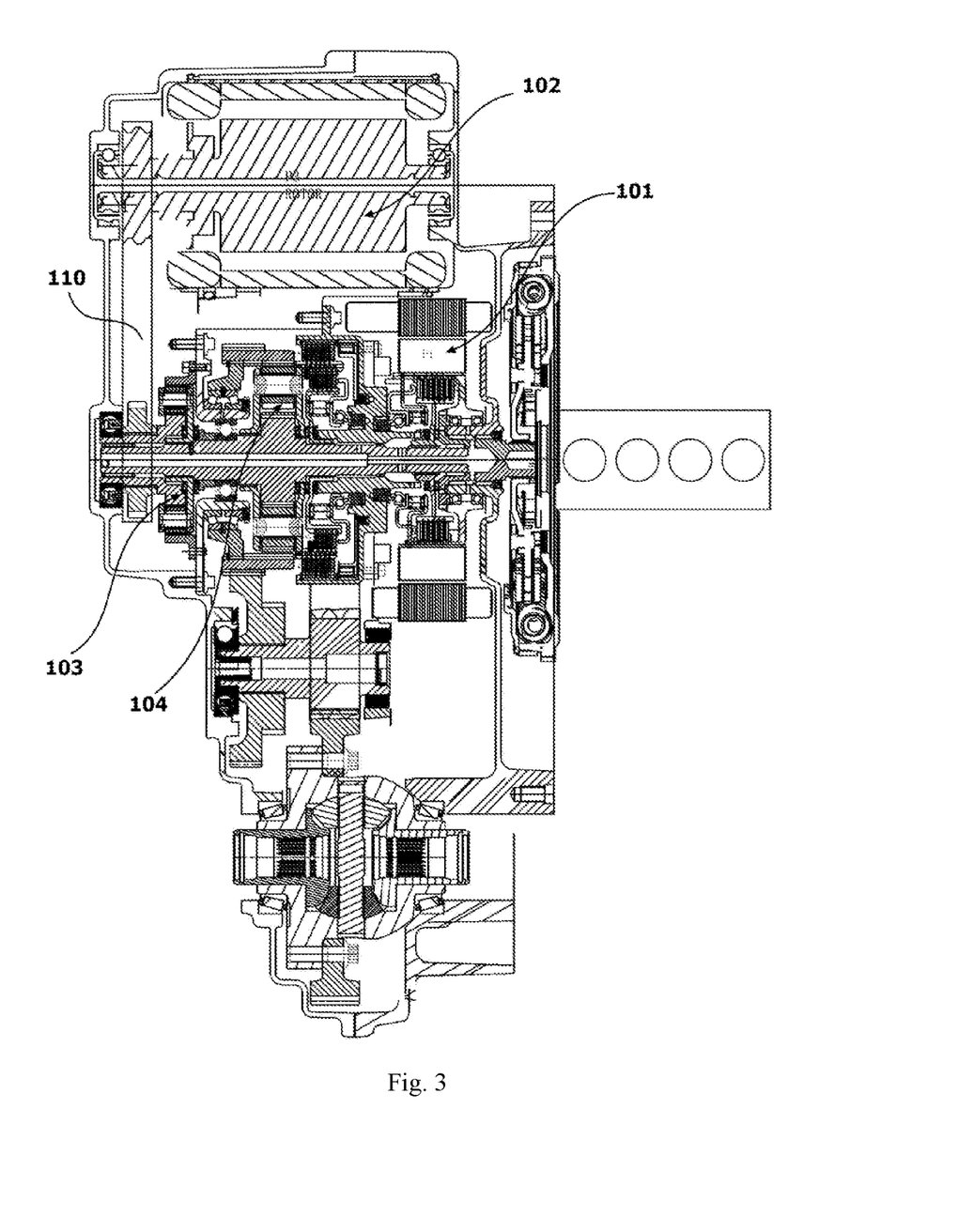
FIG. 3 is a schematic structural diagram of a power system according to yet another embodiment of the present invention.

FIG. 3 is a schematic structural diagram of a power system 100 according to yet another embodiment of the present invention. As shown in FIG. 3, in the present embodiment, the first motor (P1) is arranged as in the above-mentioned embodiments, and the second motor (P3) and the first input shaft are in off-axis arrangement. The second sun gear 24 is in transmission connection with the second rotor 19 of the second motor 102 through a transmission chain 110, the second gear ring 21 is installed on the rear housing 17 and is fixed relative to the rear housing 17, and the second motor 102 transmits power to the first input shaft 2 through the second planetary carrier 53. In the present embodiment, except for the different connection modes of the second motor 102 and the first input shaft 2, other connection structures and operating modes are not much different from those in Embodiment I, so they will not be described in detail.

By adopting the power system of the present invention, the whole structural space is compact, the axial length of the transmission is shortened, and the carrying capacity is improved.

Further, the hybrid vehicle adopting the power system 100 of the present invention may also be provided with, for example, a lithium battery energy storage system, a battery management system for managing the energy storage system, and the like. Thus, the power of the second motor 102 and the first motor 101 can be directly supplied through the lithium battery energy storage system. Furthermore, the first motor 101 can charge the lithium battery energy storage system through the engine 54. These energy management systems are not the focus of the present invention, and will not be repeated here.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and deemed to cover all such other variations or modifications.

The invention claimed is:

1. A power system for a hybrid vehicle, characterized in that the power system includes an engine, a first motor, a second motor, a first planetary gear mechanism, a second planetary gear mechanism, a first input shaft, a first clutch, a second clutch, and a brake;

the engine is in transmission connection with the first motor, and the first clutch is arranged between the first motor and the first input shaft to cut off or connect power transmission between the first motor and the first input shaft through the first clutch;

the first planetary gear mechanism includes a first sun gear, at least one set of planetary gears, a first gear ring, and a first planetary carrier, the first sun gear is arranged on the first input shaft to enable the first sun gear to rotate with the first input shaft, and the first gear ring is configured to transmit power output by the power system;

the brake is arranged between the first planetary carrier and a housing of the power system, and the brake is engaged to realize a first gear of the power system; the second clutch is configured to enable the first planetary carrier to rotate with the first input shaft when the second clutch is in an engaged state, to realize a second gear of the power system; and the second motor is connected to the first input shaft and is configured to drive the first input shaft to rotate, the second motor is connected to the first input shaft through the second planetary gear mechanism, and the second planetary gear mechanism includes a second sun gear, at least one set of planetary gears, a second gear ring, and a second planetary carrier; characterized in that any one of the three components, namely the second sun gear, the second gear ring, and the second planetary carrier, is fixed relative to the housing of the power system, a second rotor of the second motor is in transmission connection with one of the unfixed components to power it, and the other unfixed component is in transmission connection with the first input shaft to drive the first input shaft; wherein the second sun gear is fixed to a rear housing, the second gear ring is fixed on the second rotor of the second motor and rotates together with the second rotor, and the second motor transmits power to the first input shaft through the second planetary carrier; or the second sun gear is fixed on the second rotor of the second motor and rotates together with the second rotor, the second planetary carrier is installed on the rear housing and is fixed relative to the rear housing, and the second motor transmits power to the first input shaft through the second gear ring; or the second sun gear is in transmission connection with an output shaft of the second motor through a transmission chain, the second gear ring is installed on the rear housing and is fixed relative to the rear housing, and the second motor transmits power to the first input shaft through the second planetary carrier.

2. The power system for a hybrid vehicle according to claim 1, characterized in that the second rotor of the second motor is in transmission connection with one of the unfixed components in the second planetary gear mechanism through a rotor support plate.

3. The power system for a hybrid vehicle according to claim 1, characterized in that the power system further includes an intermediate support fixedly installed at one end of a front housing close to the first planetary gear mechanism, and a cavity structure for installing the brake and a third actuator cylinder corresponding to the brake is formed between the intermediate support and the front housing.

4. The power system for a hybrid vehicle according to claim 3, characterized in that the first gear ring is in transmission connection with an output gear of the power system, the output gear is supported on the intermediate support through a first support bearing, and the intermediate support is supported on the first planetary carrier through a sliding bearing.

5. The power system for a hybrid vehicle according to claim 1, characterized in that the power system further includes a second input shaft sleeved over the outside of the first input shaft, and the first input shaft and the second input shaft are independent of each other; and one end of the second input shaft is in transmission connection with the first planetary carrier, the other end of the second input shaft is in transmission connection with the second clutch, and the second input shaft is also in transmission connection with the brake.

6. The power system for a hybrid vehicle according to claim 3, characterized in that the power system further includes a first actuator cylinder corresponding to the first clutch and a second actuator cylinder corresponding to the second clutch; and the first actuator cylinder, the second actuator cylinder, and the third actuator cylinder are all arranged in the front housing, and an oil channel connected to the first actuator cylinder, the second actuator cylinder and the third actuator cylinder is also arranged in the front housing.

7. The power system for a hybrid vehicle according to claim 4, characterized in that the power system further includes a driven gear meshed with the output gear and a parking ratchet for braking, wherein the driven gear and the parking ratchet are integrated.

8. The power system for a hybrid vehicle according to claim 1, characterized in that the power system further includes a differential mechanism and an intermediate shaft for outputting power, and the differential mechanism is in transmission connection with a main reduction gear of the intermediate shaft through a third planetary gear mechanism, wherein the third planetary gear mechanism includes a third sun gear, at least one set of planetary gears, a third gear ring, and a third planetary carrier, any one of the three components, namely the third sun gear, the third gear ring, and the third planetary carrier, is fixed relative to the housing of the power system, the main reduction gear is in transmission connection with one of the unfixed components to power it, and the other unfixed component is in transmission connection with an input end of the differential mechanism to drive the differential mechanism.

9. The power system for a hybrid vehicle according to claim 6, characterized in that the first actuator cylinder controls the first clutch through a first release bearing, and the second actuator cylinder controls the second clutch through a second release bearing.

* * * * *